US009229991B2

(12) United States Patent
Isaacs et al.

(10) Patent No.: US 9,229,991 B2
(45) Date of Patent: Jan. 5, 2016

(54) COMPUTER-IMPLEMENTED SYSTEM AND METHOD FOR EXPLORING AND FILTERING AN INFORMATION SPACE BASED ON ATTRIBUTES VIA AN INTERACTIVE DISPLAY

(71) Applicant: Palo Alto Research Center Incorporated, Palo Alto, CA (US)

(72) Inventors: Ellen Isaacs, San Jose, CA (US); Mudita Singhal, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 351 days.

(21) Appl. No.: 13/866,926

(22) Filed: Apr. 19, 2013

(65) Prior Publication Data

US 2014/0317051 A1 Oct. 23, 2014

(51) Int. Cl.
*G06F 17/30* (2006.01)

(52) U.S. Cl.
CPC .... *G06F 17/30554* (2013.01); *G06F 17/30705* (2013.01); *G06F 17/30716* (2013.01); *G06F 17/30867* (2013.01); *G06F 17/30905* (2013.01)

(58) Field of Classification Search
CPC .............. G06F 17/30867; G06F 3/011; G06F 3/04842; G06F 17/3089; G06F 17/30716; G06F 17/30905

USPC .......................................................... 707/769
See application file for complete search history.

(56) References Cited

U.S. PATENT DOCUMENTS

| 6,275,229 | B1* | 8/2001 | Weiner et al. ................. 715/764 |
| 8,489,627 | B1* | 7/2013 | Brandt .......................... 707/765 |
| 2008/0263022 | A1* | 10/2008 | Kostorizos et al. ............... 707/5 |
| 2014/0129942 | A1* | 5/2014 | Rathod .......................... 715/720 |

OTHER PUBLICATIONS

IN-SPIRE., "IN-SPIRE Visual Document Analysis." Retrieved from the Internet: URL:http://in-spire.pnnl.gov/, [cached on Feb. 14, 2013].

* cited by examiner

*Primary Examiner* — Yuk Ting Choi
(74) *Attorney, Agent, or Firm* — Patrick J. S. Inouye; Krista A. Wittman

(57) ABSTRACT

A computer-implemented system and method for exploring and filtering an information space based on attributes via an interactive display is provided. Entities related to an information space are retrieved. Attributes associated with the entities are identified. The entities are displayed as a list. A status representation of the entities and at least one attribute graph based on one of the attributes from the entity list are presented. A status of a user with respect to one or more of the entities is tracked. The status for the one or more entities is received from the user. The user status is applied to the status representation and the attribute graph.

20 Claims, 6 Drawing Sheets

COMPUTER-IMPLEMENTED SYSTEM AND METHOD FOR EXPLORING AND FILTERING AN INFORMATION SPACE BASED ON ATTRIBUTES VIA AN INTERACTIVE DISPLAY

This invention was made with government support under Contract No. 2011-11090700005 CSS ProVisTasks 6. The government has certain rights in the invention.

FIELD

This application relates in general to filtering information based on attributes and, in particular, to a computer-implemented system and method for exploring and filtering an information space based on attributes via an interactive display.

BACKGROUND

Research is necessary to advance knowledge and is often conducted to increase a user's understanding about a particular issue or topic. Currently, a majority of the research is conducted via the Web. However, conducting research can be time consuming, inefficient, and inaccurate due to the large number of electronic documents available, which often times cannot be read in their entirety.

Conventionally, users conduct research by entering a query, locating results that satisfy the query, and reviewing at least a portion of the results, which are often provided as a list. For example, a user, writing a thesis paper on Prader-Willi syndrome, conducts research relating to the syndrome by identifying documents that mention or are related to the syndrome. Once accessed, the user can begin reviewing the documents, but is unable to determine how much of the material she has accessed with respect to the information space for Prader-Willi syndrome. Thus, the user must keep reading until he believes that he has covered an adequate amount of material. One indication that may signal to the user that he has reviewed enough of the material is when the user starts seeing some of the same material from different sources. However inherent memory limits severely restrict the ability of the user to keep a mental map of the progress in addition to the knowledge extracted from the documents review.

Also, using conventional search methods, the user is unable to identify how much of the information space she has researched and thus, does not know whether she should continue to conduct research or whether the documents she has accessed and reviewed are sufficient for covering the information on Prader-Willi. Accordingly, the current search tools fail to provide a user with an overview of an information space or provide the user with means for tracking progress through that space and recognizing when the topic has been sufficiently researched by the user.

Therefore, there is a need for providing tools that allow users to view a search space for a topic and track review progress of that space. Preferably the tools are interactive so the user can perform a guided filtering of the result set down to a manageable list for review.

SUMMARY

An embodiment provides a computer-implemented system and method for filtering search results via an interactive display. A computer-implemented system and method for exploring and filtering an information space based on attributes via an interactive display is provided. Entities related to an information space are retrieved. Attributes associated with the entities are identified. The entities are displayed as a list. A status representation of the entities and at least one attribute graph based on one of the attributes from the entity list are presented. A status of a user with respect to one or more of the entities is tracked. The status for the one or more entities is received from the user. The user status is applied to the status representation and the attribute graph.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Exploring an information space using conventional search tools can be time-consuming and frustrating due to the large amounts of information that can be obtained. During review, a user is unable to determine how much of a particular information space she has covered since the current search engines display the results as lists of documents that can be listed on multiple pages. Further, the conventional search tools fail to provide any assistance in weeding through the often times numerous results. Interactive filter tools allow a user to visualize an information space, review entities in the information space, identify those entities most important for review, and determine which part of the information space to review next.

Figure 1:
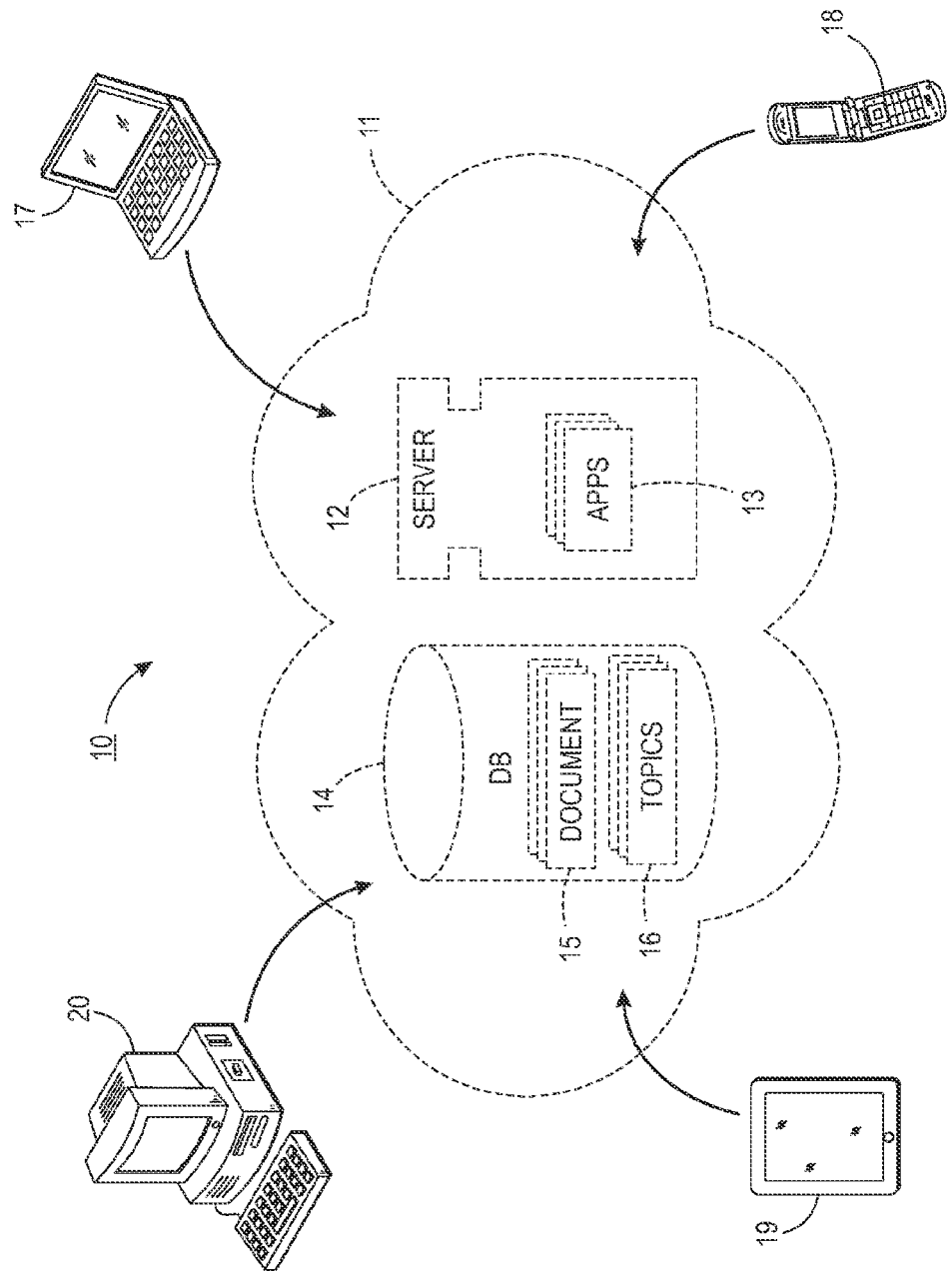
FIG. 1 is a block diagram showing a computer-implemented system for exploring and filtering an information space based on attributes via an interactive display, in accordance with one embodiment.

The filter tools are used within an interactive display for presenting the results. FIG. 1 is a block diagram showing a computer-implemented system for exploring and filtering an information space based on attributes via an interactive display, in accordance with one embodiment, in accordance with one embodiment. The system can operate via a cloud computing environment, which allows end users to access and utilize remotely-stored applications 49 without requiring the users to install software or personal data. Instead, clients receive cloud-based software 13 and stored data. Each of the end users operate computing devices 17-20, including a desktop computer 20, laptop 17, tablet 19, or cellular telephone 18, as well as other types of computing devices, to access the applications 13 and data 15, 16 stored on remote servers 12 and databases 14, respectively, via a network 11. At a minimum, each computing device should include accessibility to an internetwork and have the ability to execute an application.

The user device 17-20 and servers 12 include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to user devices, are possible.

Once accessed, the application 13 allows the user to visualize an information space, filter the information set, and track her progress through the information. The information space can include a plurality of entities that are each associated with one or more attributes defining characteristics of that entity and can also include relationships amongst the plurality of entities. An entity can include documents, movies, insurance claims, cars, patents, photographs, and social networking updates, such as statuses or tweets. Other types of entities are possible. For instance, an information space can cover "movies," while the individual entities can be particular movies, such as "Big," "You've Got Mail," "Can't Buy Me Love," "The Temple of Doom," "The Wood" and many others.

At a minimum each entity should be associated with one or more attributes. For example, news articles are associated with attributes for publication source, author, topic, date published and others, whereas movie attributes include director, actors, genre, release date and others. The entities can be obtained via a search by the user or by accessing stored information, such as in a database. The user can interact with the entities via an interface on the user devices.

The user device 17-20 and servers 12 can include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Interactive Display

Figure 2:
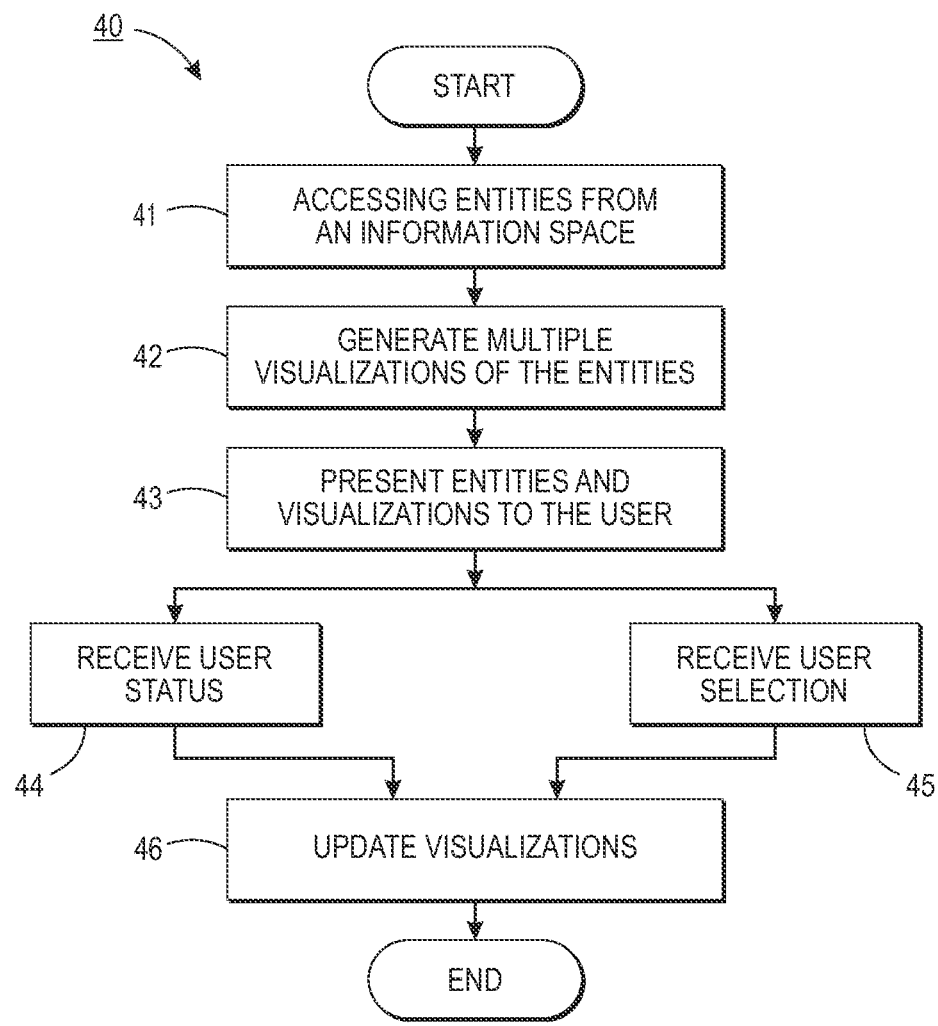
FIG. 2 is a flow diagram showing a method for exploring and filtering an information space based on attributes via an interactive display, in accordance with one embodiment.

The interactive display allows a user to visualize the information space and narrow the results for review appropriately. FIG. 2 is a flow diagram showing a method for exploring and filtering an information space based on attributes via an interactive display, in accordance with one embodiment. Entities associated with an information space are accessed (block 41) based on instructions from a user. For instance, a user can conduct a search for information and the entities are provided as results of the search. Additionally, the information space can be accessed from storage, such as a database. Multiple visualizations of the entities are generated (block 42) and can include an entity list, attribute graphs, and an entity view. Each visualization can represent the entities based on a particular attribute, such as source of the entity, date associated with the entity, and user status with respect to that entity. The different types of visualizations are described in detail below with reference to FIG. 3. Other visualizations are possible, such as a thematic display, as further described below with reference to FIG. 4.

The entity visualizations are presented (block 43) to a user via an interactive display. Once presented, the user can interact with the entities in the particular information space by marking one or more of the entities with a status (block 44) or by selecting the entities displayed within one of the visualizations (block 45). Once marked, at least one of the other visualizations is updated (block 46) to reflect the user markings. Entity statuses are further discussed below with reference to FIG. 3.

Figure 3:
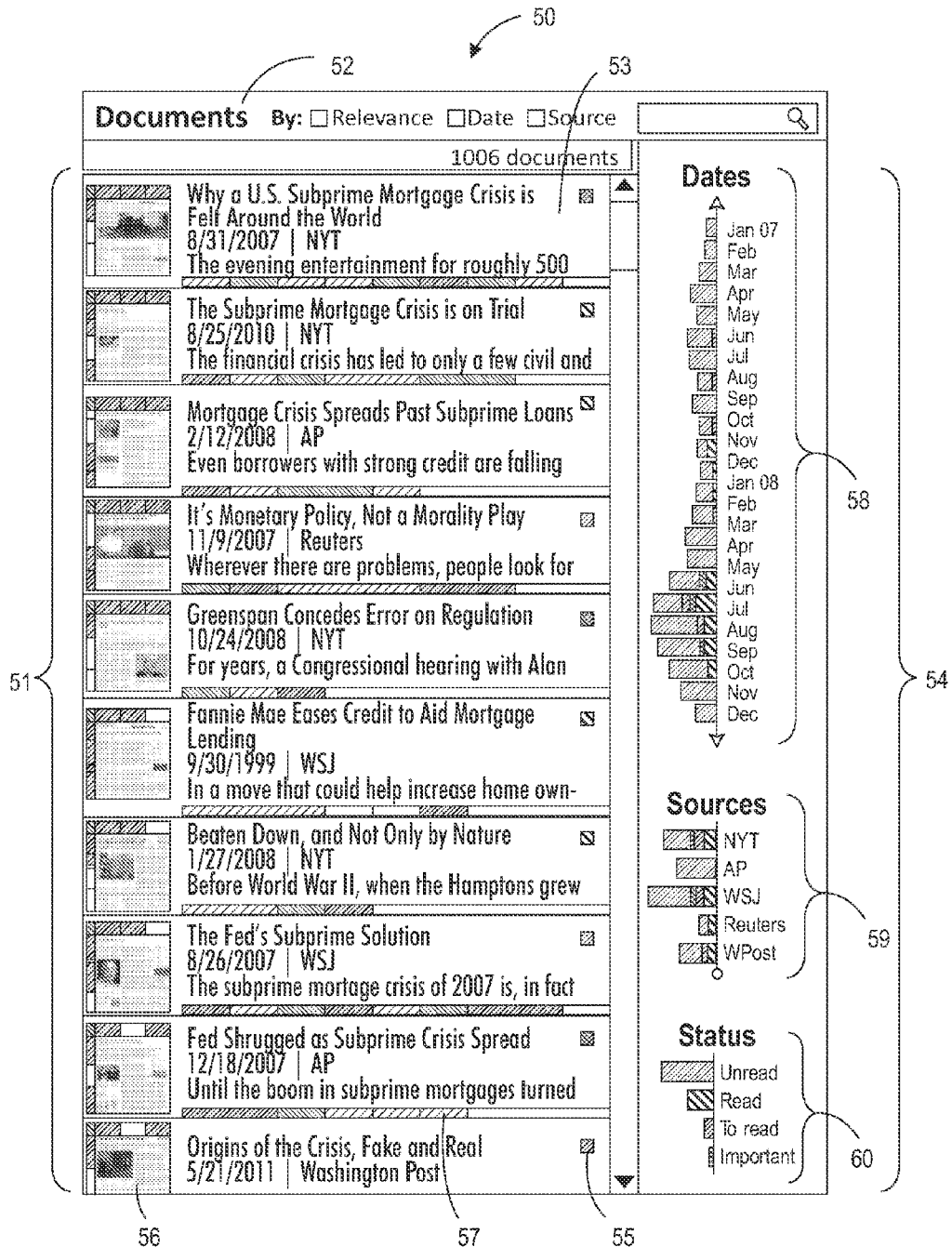
FIG. 3 is a screenshot showing, by way of example, a visual interface for displaying entities and visualizations of the entities.

The user can interact with the entities of a particular attribute type within a particular information space via a visual layout. FIG. 3 is a screenshot showing, by way of example, an interface 50 for displaying entities and visualizations of the entities. The interface 50 can include an order field 52, entity list 51 and attribute graphs 54.

Entity List

The entities presented in the list can include all entities associated with an information space or those entities identified as results of a search conducted by a user. The user can select to order the listed entities by relevance, date, or source, as well as by other attributes, by selecting an appropriate box in the document order field 52. In the example with reference to FIG. 3, the entities are documents that are part of an information space regarding "mortgage." Each entity, or document, displayed in the list can be associated with an identifier, such as a title, a date, a source, a brief summary, a status 55, a thumbnail 56, and a relevance bar 57.

The thumbnail 56 can be an image of the entity or an image of a representation of the entity. For instance, when the entity is a document, a first page of the document can be displayed. Alternatively, a movie can be represented by a movie poster, which is displayed as the thumbnail.

Entity Triage

A user can perform entity triage by assigning a status, such as "to read," "important," "read," or "unread" to one or more entities, or documents, in the list 53. Other statuses are possible, such as "irrelevant," "save," or "send to." For instance, the user can click on a check box to the right side of the document header to toggle between different statuses. The system can also assign certain status states automatically, such as marking an entity as "read" when the user selects that entity with a pointer device or "unread" when the user assigns no status to that entity. Statuses can also include sub-categories, such as priority levels on entities marked as "to read," or reasons why an entity is marked with a particular status, such as "important." Additionally, a combination of user assignments and default assignments can be used to identify particular entities as unread or read. Each status can be represented by a different color or other marking, such as text, patterns, or symbols. Document triage allows the user to easily identify which entities she has reviewed, not yet reviewed, or plans to review.

Entity Attribute Graphs

The entity attributes graphs 54 can be located adjacent to the entity list 51 to provide an overview of the entities within the list, and can include a date histogram 58, source histogram 59, and status histogram 60. Other attributes are possible, including author and cited works for document entities; producer and actor for movie entities; and cost and type for car entities. As well, other types of graphs can be used to represent the entity attributes, such as a pie chart, line graph, map, or word cloud. In the example, with reference to FIG. 3, the entities are documents and are represented by attribute graphs for date, source, and status. The date range histogram 58 is a zoomable visualization that can represent a hierarchy of variables, such as time ranges, including minutes, hours, days, weeks, months, years, or longer. Other time ranges are possible. The time ranges can be set by pulling or contracting the ends of the histogram line or through some other means, such as having explicit buttons to drive the zoom or GUI elements to specify a range. Each time period within the range is represented by a bar, and a length of the bar identifies a number of entities within the list 51 that were published, released during, or otherwise associated with that particular time. A longer bar indicates more entities associated with that particular time, while a shorter bar indicates less entities. In another embodiment, the date bars represent the dates of events associated with the entities.

The source histogram 59 includes one or more sources of the entities in the list 51. The source can be an individual or organization that published or released the entity or a representation of the entity. For instance, an organization can include variables for a news organization, an academic institution, a private company, or a department within an organization. Alternatively, the source can include variables for a medium in which the entity was originally published, such as a book, newspaper, Website, magazine, video, or other medium. Additionally, the source histogram can also be modified, such as by zooming in or out of the histogram, to display types of sources rather than individual sources. Other modifications of the histogram are possible, such as stretching and shortening the graph. The types of sources can include news articles, scholarly articles, internal briefs, classified documents, and so on. Other sources are possible. The user can select which of the sources to display in the histogram, such as from a list. Each source listed in the histogram can be associated with a bar that represents a number of entities associated with that particular source. Zoom capabilities, such as zoom-in and zoom-out, for the source histogram can show a hierarchy of sources.

Meanwhile, the status histogram 60 can include the user's triage activities indicating the entity statuses. The user status variables can include "unread," "read," "to read," and "important." Other statuses are possible. The number of marked entities for each status is calculated and used to determine a length of the bar for that status. The user can utilize the status histogram 60 to determine how she is progressing through the entities. In one embodiment, each status is assigned a different color to distinguish between the different statuses and the color can be applied to the bar for that status. For instance, a gray color is assigned to an unread status, a blue color to a read status, a green color to a to read status, and a red color to an important status. Other colors are possible.

Figure 6:
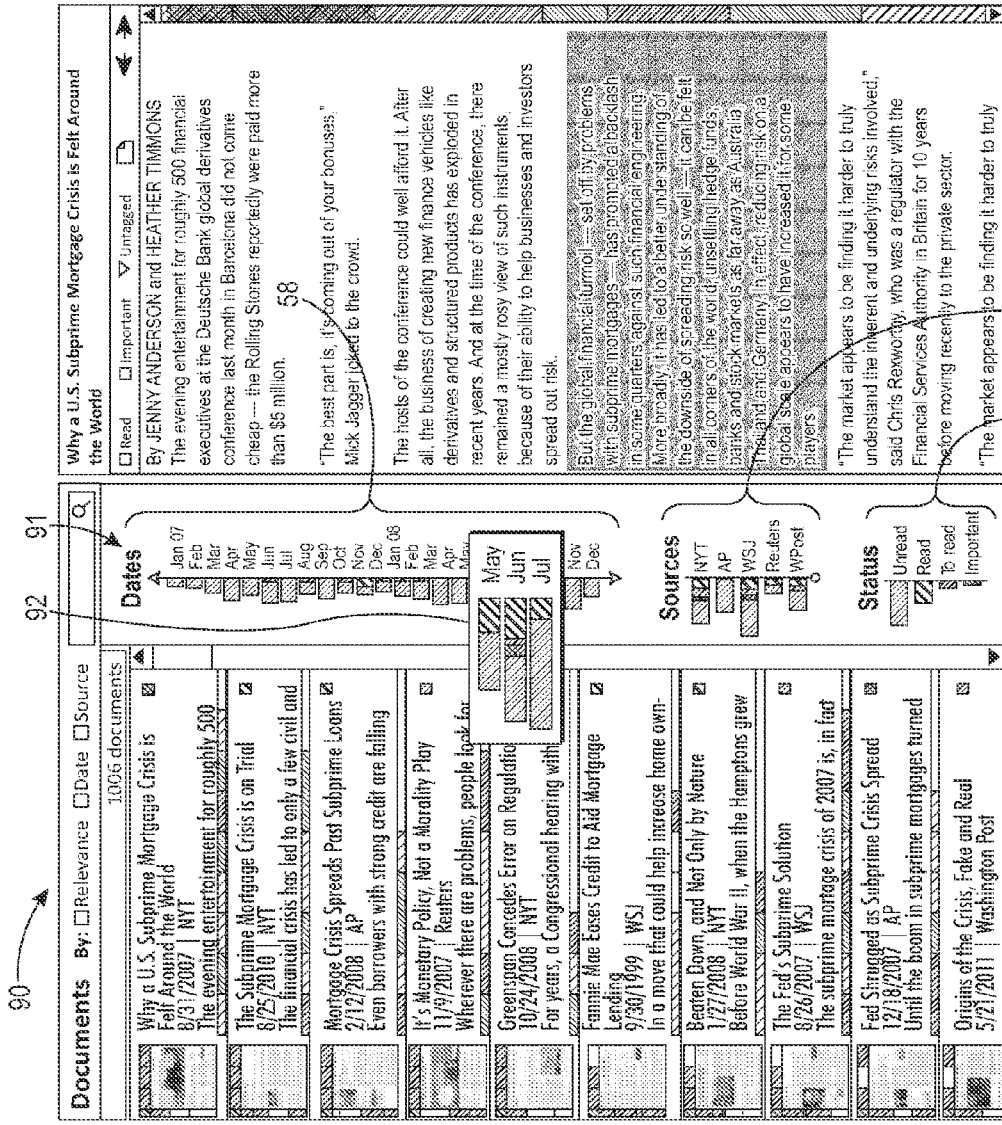
FIG. 6 is a screenshot showing, by way of example, a visual interface for filtering entities.

The document list 51 and attribute graphs 54 are interrelated, such that a selection of an entity or attribute in one of the sections is reflected in the other section, as further described below with reference to FIG. 6.

Entity View

Figure 4:
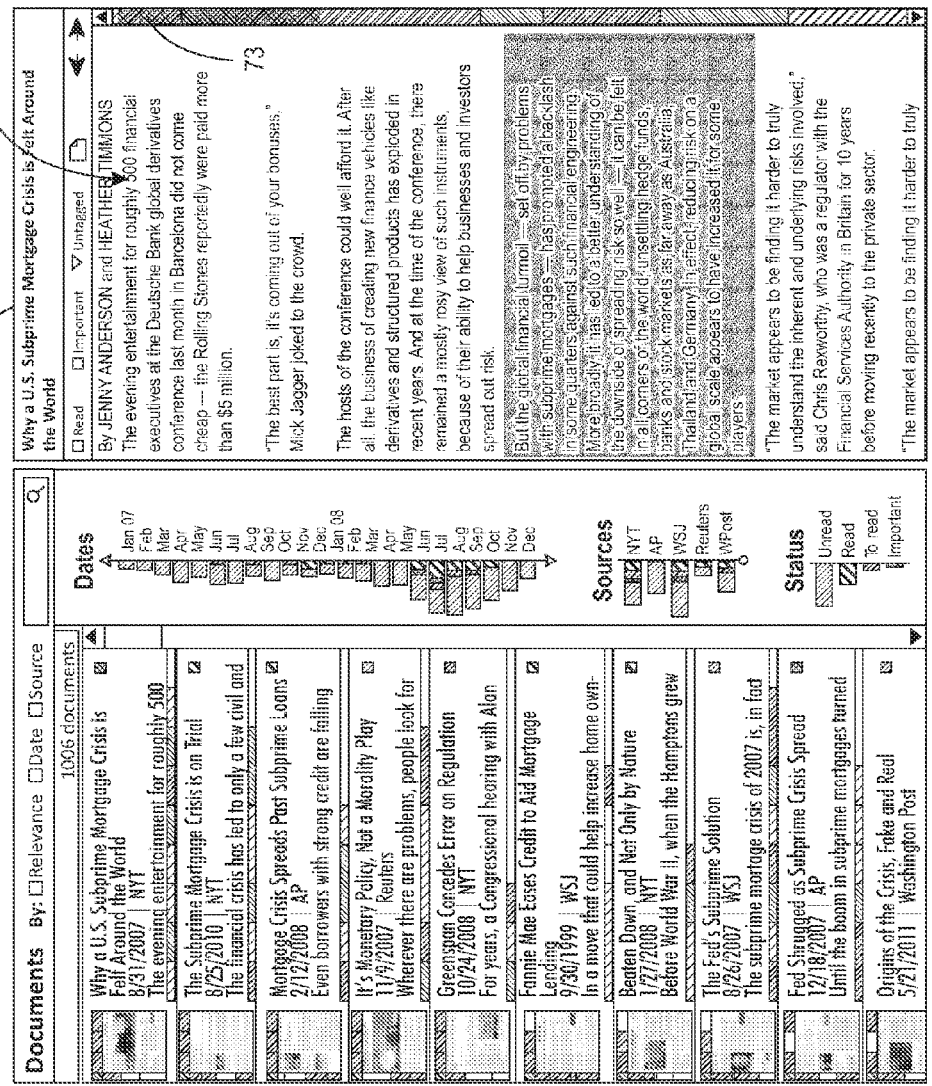
FIG. 4 is a screenshot showing, by way of example, a visual interface with an entity view.

The user can analyze the entities in further detail by selecting one of the entities in the list for review. FIG. 4 is a screenshot showing, by way of example, an interface with an entity view. Upon selection, text and images associated with an entity can be displayed in a view section 71 of the interface 150. At least a portion of the information associated with the entity can be displayed. However, in one embodiment, the entire entity or entire representation of the entity can be provided and the user can scroll through the displayed entity via a scrollbar. The scroll bar can include a movable bar 153 and a track 154.

Thematic View

Figure 5:
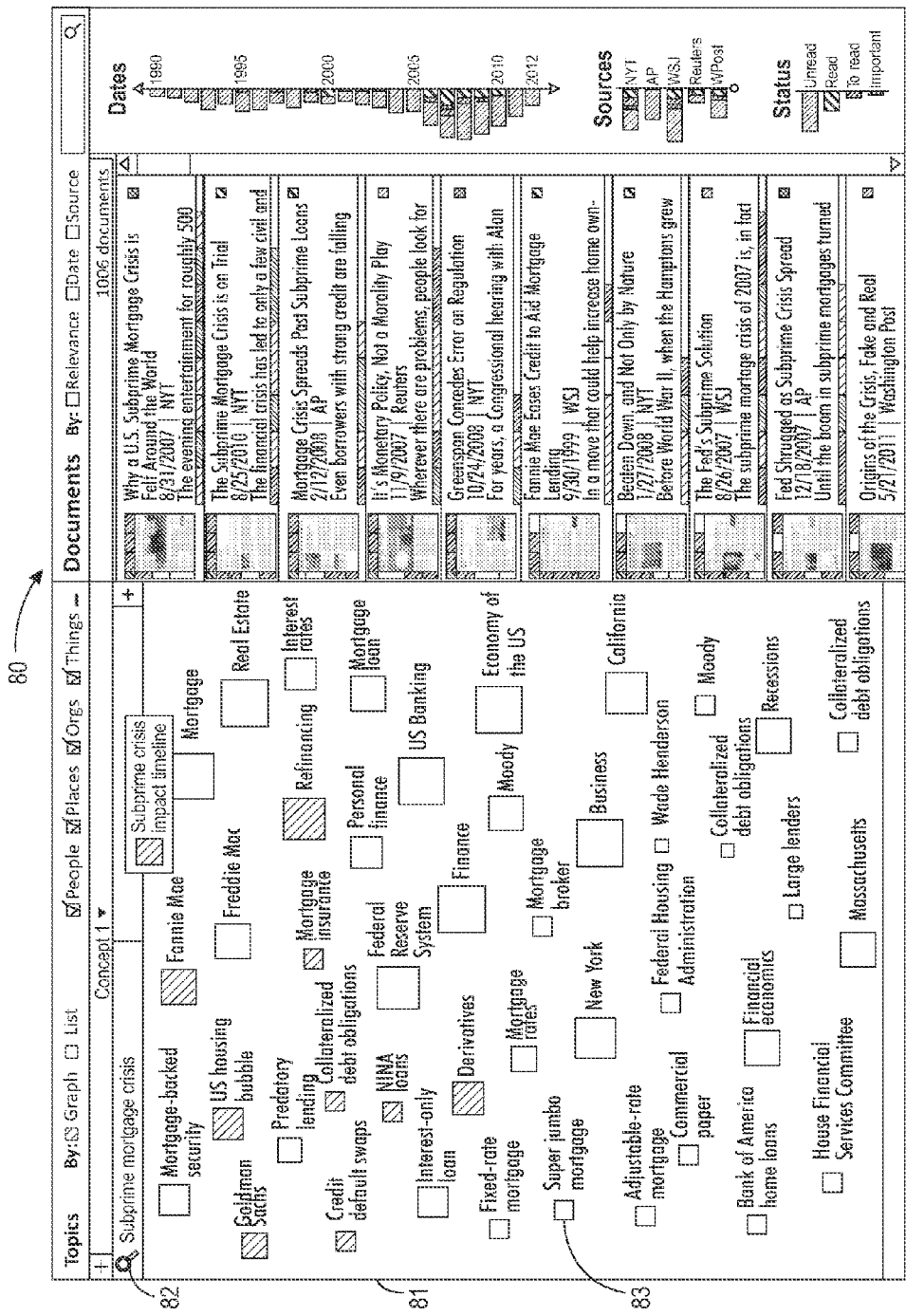
FIG. 5 is a screenshot showing, by way of example, a visual interface with a thematic view.

The entities can be clustered by theme and presented in a display. FIG. 5 is a screenshot showing, by way of example, a visuospatial search interface 80 with a thematic view. The thematic view can include a graph section 81 that provides a visual display of clustered entities 83, as described in commonly-owned U.S. Patent Application Publication No. 2014/0317104, titled "Computer-Implemented System and Method for Visual Search Construction, Document Triage, and Coverage Tracking," by Isaacs, filed on Apr. 19, 2013, pending, the disclosure of which is hereby incorporated by reference. In the example with respect to FIG. 5, the entities are documents within an information space relating to the "mortgage crisis." The entity list 51 includes all of the documents in the information space, which are clustered by at least one attribute of the entities. In this example, the documents are clustered by topics of the documents, including "Fannie Mae," "Mortgage," and "U.S. Housing Bubble." The clustered entities 83 are then displayed via a theme box in the graph section 81. Each theme box can be represented by an icon or a shape, such as a square or circle, and can be associated with an identifier, such as a name of the topics. Other types of theme boxes are possible. Each of the documents can be associated with one or more topics.

The clustered entities 83 can be displayed randomly or in a particular order, which can be selected by the user or as a default. In one embodiment, those topic results that are highly related are placed near one another in the graph, while the less related topics are located further apart.

In a further example, an information space for cars, which includes entities for make and model, can be grouped by manufacturer. Thus, a theme box would represent "Ford," "Chevrolet," "Honda," "Toyota," "Hyundai," "Audi," "Saab," and so on. The entities represented by the "Honda" theme box could include "Civic," "Accord," "Pilot," "Passport," and "Odyssey," as well as other models of Honda manufactured cars. In an additional example, an information space for movies with individual movies as entities, can be clustered based on genre, including romantic comedy, comedy, horror, action, adventure, drama, fantasy, and science fiction. Other genres are possible. The entities can also be clustered by other attributes associated with the entities. For instance, cars can be clustered based on engine size or average miles per gallon, while movies can be clustered by producer, actor, or year.

The graph section 81 can also include a search field 82 so that a user can conduct a search of the entities based on one or more attributes. For instance, based on the example of FIG. 5, the user may wish to identify topics of entities having particular attributes. The user enters a query with search topics for "Subprime Mortgage Crisis" and "Subprime Crisis Impact Timeline." The topics with entities that satisfy the search query are presented as search results, such that those topics most relevant to the query are located near a top of the entity graph 81 and the topics less relevant are located further down the graph. The list of entities 51 can be updated to include only those entities associated with the result topics displayed in the list. As well, the attributes graphs can be updated to include only the entities associated with the result topics.

Returning to the above movie example, the user wants to see the types of movies that the actor, "Tom Hanks" acted in during the 1980's. The results can include the genres of romantic comedy, comedy, and crime. The entities within the romantic comedy genre include "Big," "Splash," and "The Money Pit," while the comedy genre includes "Dragnet," "Nothing in Common," and "Turner and Hooch." Additionally, "Dragnet" and "Turner and Hooch" are also grouped in the genre for crime. The entity list and attribute graphs are updated to include only those entities that are associated with displayed genres in response to the search.

One or more clusters of entities in the entity graph 81 can be selected by the user and the remaining clusters of entities that are related to the selected entity cluster can be identified. The user can select the entity cluster 83 via a pointer device, such as a mouse, stylus, finger, or other type of pointer device. Specifically, the user can use the pointer device to hover over the topic box associated with the topic or to click or tap on the topic box. The related entity clusters 83 can be identified by highlighting or color-coding the associated theme boxes based on a relevance of that entity cluster 83 to the selected entity cluster 83. In one example, a color similar to a color of the selected entity cluster 83 can be assigned to those entity clusters 83 having a higher relevance to the selected entity cluster 83, while a different color is assigned to entity clusters 83 that are less relevant. Other methods for visualizing relatedness are possible, such as varying the darkness of the color to show degree of relevance or using shape, perceived depth, font treatment, or animation, as well as patterns and icons. The relevance, or relatedness, of an entity cluster can be determined by comparing the entities associated with the selected entity cluster with the entities of each other entity cluster. The entity clusters with entities most related to the entities of the selected entity cluster are selected as related entity clusters. In one example, the entities can be compared using cosine similarity. However, other means for determining relevance can be used.

Upon selection of a result topic, the documents in the list are also updated to reflect only those documents that are associated with the selected result topic. As well, each of the document attribute graphs is also updated to reflect the documents associated with the relevant topics.

Entity Filtering

Filters can be applied to identify entities of interest. Any changes to the entities based on the filters can also be applied to the other entity visualizations, including the attribute graphs. FIG. 6 is a screenshot showing, by way of example, a visual interface 90 for filtering entities. The entities can be filtered based on one or more of the attributes associated with the entities, including date, source, or status. Other attributes are possible, including author and cited works for documents; producer and actor for movies; and cost and type for cars.

However, in the following example, date, source, and status filters will be discussed with reference to document entities. The date range 91 of all the entities in the list can be adjusted to display only a subset of the entities that fall within a selected date range. For example, when the entities are documents, the documents can be organized by publication date along the date histogram 58. The time range of all the documents associated with the information space is from 1990 to 2012. However, most of the documents occur later in time, from around 2005 to 2012, with the years 2007 and 2008 having the most documents published. Thus, a user may want to focus more closely on the years during which the most documents were published.

To filter the documents, the user can change the date range from 1990 through 2012 to 2007 through 2008. Those documents published from 1990 to 2006 and 2009 to 2012 are no longer represented by the date histogram and the same changes are made to the entity list and other attribute graphs, such that only those documents published between 2007 to 2008 are represented by each display.

The non-represented documents can be removed from the display or can fade into the background, such as by reducing an intensity of the color or size. Other date filters can be used, such as months, days, or times. Additionally, since the time range of the date histogram is greatly reduced, each bar can now represent a shorter amount of time, such as a month, whereas the complete date histogram from 1990 to 2012 used the bars to represent years. Other examples are possible. The other visualizations, including the entity list and other attribute graphs can be updated to include only those documents published during 2007 or 2008.

With respect to movies, the time can represent a date that a particular movie was released. For instance, using the timeline in the above-example, all entities associated with a date during the time range from 1990 to 2012 are displayed in the entity list. The list can include movies, such as "Can't Buy Me Love," "The Dark Knight," "Twilight," "Wall-E," "Die Hard," "The Shawshank Redemption," "The Godfather," "Men in Black," "Inception," "Transformers," "Ocean's Thirteen," "Captain America: The First Avenger," "The Hobbit," and many others. To reduce the number of entities displayed and review only those entities from a particular time period, the user can select a shorter time range, such as from 2007 to 2008. Accordingly, the date histogram is updated to reflect only those movies that were released during 2007 and 2008, including, for instance, "The Dark Knight," "Twilight," "Wall-E," "Transformers," and "Ocean's 13." The entity list and other attribute graphs are updated to include only the movies released during 2007 and 2008.

The entities can also be filtered by source. A source histogram 59 organizes entities associated with an information space by a publication source. The sources can include companies, journals, newspapers, universities, briefs, Web published documents, and books, as well as other sources, such as specific organizations, including the New York Times (NYT), Associated Press (AP), Wall Street Journal (WSJ), Reuters, and Washington Post (WPost). In one example, the user can select to further research only those documents from particular sources, such as the WSJ and WPost. Accordingly, documents published by the NYT, AP, and Reuters can be removed or made less visible to the user by using a lighter color of text. Additionally, the entity list and other attribute graphs can be updated to include or highlight only those documents that were published by the WSJ and WPost.

In the movie example, the source of the movies can refer to the production company that released the movies and can include Apollo Pictures, Warner Brothers, Castle Rock Entertainment, Columbia Pictures Corporation, Dream Works SKG, Paramount Pictures, New Line Cinema, and Twentieth Century Fox Film Corporation, as well as many other production companies. The user can select one or more of the production companies, such as Warner Brothers and Paramount Pictures and those movies, such as "The Dark Knight" and "Inception," produced by Warner Brothers and "Captain America: The First Avenger" and "The Godfather," produced by Paramount Pictures are filtered for inclusion in the source histogram, while the remaining movies not produced by Warner Brothers or Paramount Pictures can be removed from the graph. The list of entities and other attribute graphs are updated to include only those movies from Warner Brothers and Paramount Pictures.

The status filter can be used to identify a portion of the displayed entities in the list that are marked with a particular status by the user. The user statuses can include "unread," "read," "to read," and "important." When the entities are documents, the status histogram 60 can be used to organize the documents of the by user status. In one example, the user may wish to review all the documents that she has marked as "to read." The "to read" documents can be selected by selecting the bar associated with the "to read" status of the status histogram 60 with a pointer device. The documents with a "to read" status remain displayed in the entity list, while the documents with other statuses are removed from the display or visually reduced so that the "to read" documents are more visibly displayed. The remaining attribute graphs are updated to include only those documents that are associated with the selected user status.

With regards to the movie example, the different statuses can include "watch," "to watch," "not interested in watching," and "recommended by friends." The user can select one or more of the statuses to filter the entities and identify only those entities that are associated with one of the selected statuses. The entity list and attribute graphs are updated to include only those entities with the selected statuses.

Additionally, the user can apply filters to two or more of the entity attributes to identify entities that satisfy the filters for each attribute. For instance, a user may wish to review all those document entities that she has read and that were published in 2008. To apply the filters, the user can identify the bar associated with the year 2008 and select the color blue, which is associated with the "read" status, using a pointer device. Accordingly, based on the filters, the date histogram, source histogram, and entity list can be updated to display only those documents published in 2008 that were read by the user.

During the user's review of the entities, she may identify an entity that is not of interest. The user can elect to remove the entity by selecting a menu option (not shown) for deleting or hiding that entity. Upon removal of the entity, the interactive system learns which entities are not relevant to the user and updates the entity list and attribute graphs.

Additionally, at any point during the user's review of the entities, she can place a pointer device over any portion of the histograms to reflect a sub-region 91 of the graph in higher resolution to be able to see the small status markings easily. Additionally, a display of a graph sub-region can be used by the user to select a portion of one of the histogram bars associated with a variable. For example, the user can open a pop up window 91 by hovering his pointer device over the date histogram to display in further detail the months of May, June, and July 2008. The pop up window displays the month variables 91 in greater detail so that a user can filter the entities by selecting a user status displayed on one of the bars, such as those documents published during June 2008 that the user has read. The read documents of June 2008 can be indicated by a color or a symbol, including dark stripes over a representation of the read entities for the June variable.

Coverage Tracking

A user can easily track her research using the statuses assigned to one or more entities. Specifically, the user can also track her status with respect to review of the entities using the attribute graphs. For instance, a user can see how many entities are associated with a particular status, date, or source, as well as other attributes. When the entities are documents, a user status of the documents can be reflected on the attribute graphs, including the date histogram and source histogram, to indicate how much material the user has covered by source and time.

With regards to the date histogram, the user statuses can be displayed by applying an appropriate status color to the bars of the histogram. For example, with reference to FIG. 5, the year 2008 in the date histogram 58 is associated with a longest bar indicating the year during which the most documents were published. If 400 documents were published in 2008 and the user has read 20 of the documents, then a length of the bar is colored purple to indicate the amount of documents read by the user that were published in 2008. Specifically, the portion of the bar that is colored purple is proportionate to the number of documents read. Thus, 5%, or ⅟20, of the bar for 2008 would be colored purple. Also, in this example, the user has marked 50 documents with a "to read" status, which is 12.5% of the total documents for 2008. Thus, 12.5% of the bar is shaded, or colored, green to indicate a portion of the documents published in 2008 that the user intends to read. The color green can be applied adjacent to the color red for read documents.

The order in which the user statuses are displayed along each bar can be selected by the user, implemented as a default, or can be arbitrary. Other colors or markings to indicate user status are possible. The user statuses can be similarly applied to the source histogram 139 to indicate a user's progress of reviewing documents organized by source. Color coding the source histogram with user status can assist a user in identifying how much material she has covered with respect to documents published by a certain source.

As a user assigns a status to one of the documents in the list, the status is also reflected in the status histogram and the status bar of the topic results. Tracking the user's status allows that user to see how many of the documents associated with the result topics she has covered, either by reading the full document, a portion of the document or a summary of the document. The user can then use the tracked information to determine how much more of the material she needs to review to get a good understanding of the information surrounding the topics of the search query.

Returning to the movie example, the user can track how many movies she has seen in each genre, in each year of release, from each production company, as well as based on other attributes. The user can also use the tracking information to learn something, such as the type of movies she likes or an era of movies. For instance, if the user has seen lots of movies released between 1980 to 1990 and they are mostly romantic comedies, the user may determine that romantic comedies are her favorite, as well as the time. The user can then easily find other movies that have the same attributes or at least one of the attributes. For instance, the user may just determine that she likes movies released during the 80's and may want to look for movies released in the 80's that are classified as action.

Coverage tracking also allows a user to determine any biases she may have with respect to particular entities. For instance, with respect to the document example, the user may determine that she has not reviewed any documents published prior to 2008 since she was so focused on the housing crisis that she forgot to review earlier documents. Additionally, the user can use the tracking to focus her research regarding an information space by determining how many documents she has reviewed with respect to the different attributes. For instance, the user may not realize that she has only viewed documents published by the Wall Street Journal and Washington Post and thus, should begin reviewing documents from the other sources. Also, returning to the mortgage document example, the user can easily identify all documents relating to mortgages and then track her progress through the documents using the date histogram. Based on the statuses applied to the date histogram, the user identifies that she has disproportionately reviewed the documents, with most of her review focused on documents before the housing crisis. Accordingly, to properly cover the information space, the user should start reviewing documents that were published during the housing crisis to cover this important period in time relating to housing mortgages.

Although the above examples focus on documents and movies, other entities are possible, including cars, patents, photographs, and insurance claims. At a minimum each entity should be associated with one or more attributes, which can be used to filter the entities and track the user's review of the entities.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system exploring and filtering an information space based on attributes via an interactive display, comprising:
    a computing device to receive from a user instructions to retrieve entities related to an information space; and
    a server comprising a central processing unit, memory, an input port to receive the instructions, and an output port, wherein the central processing unit is configured to:
        retrieve the entities;
        identify attributes associated with the entities;
        display the entities as a list, wherein each entity in the list is associated with a relevance bar;
        present a status representation of the entities comprising a graph of the entities based on one or more statuses provided by the user, wherein each status represents a progress of the user with respect to a corresponding entity;
        present at least one attribute graph based on one of the attributes and the statuses provided by the user; and
        track a status of the user with respect to one or more of the entities by receiving the user status for the one or more entities and by applying the user status to the status representation and the attribute graph.

2. The computer-implemented system according to claim 1, wherein the central processing unit is further configured to:
    filter the entities in the list based on one or more of he attributes; and
    update the list to include only those entities that satisfy the one or more attributes.

3. The computer-implemented system according to claim 2, wherein the central processing unit is further configured to:
    update the attribute graph to include only those entities that satisfy the one or more attributes.

4. The computer-implemented system according to claim 1, wherein the central processing unit is further configured to:
    cluster the entities based on at least one of the attributes; and
    display the clustered entities.

5. The computer-implemented system according to claim 1, wherein the central processing unit is further configured to:
    assign a color to each user status;
    determine a number of the entities that satisfy each user status for each variable of the attribute represented by the graph; and
    apply the assigned color to the graph for each variable based on the number of entities associated with that status.

6. The computer-implemented system according to claim 1, wherein the attribute graphs each comprise one of a histogram, pie chart, cloud, and line graph.

7. The computer-implemented system according to claim 1, wherein the central processing unit is further configured to:
    modify the attribute graph by displaying greater resolution of at least a portion of the attribute graph upon placement of a pointer device over the attribute graph by the use and zooming in or out of the attribute graph.

8. The computer-implemented system according to claim 1, wherein the central processing unit is further configured to:
    generate at least one of a date histogram, source histogram, and status histogram as the attribute graphs.

9. The computer-implemented system according to claim 1, wherein the central processing unit is further configured to
    receive from a user, a selection at least a portion of one of the attribute graphs; and
    update the list of entities to include only those entities that correspond with the selected portion of the attribute graph.

10. The computer-implemented system according to claim 1, wherein the central processing unit is further configured to:
    receive a selection of one of the entities in the list; and
    display at least a portion of the selected entity.

11. A computer-implemented method exploring and filtering an information space based on attributes via an interactive display, comprising:
    retrieving entities related to an information space;
    identifying attributes associated with the entities;
    displaying the entities as a list, wherein each entity in the list is associated with a relevance bar;
    presenting a status representation of the entities comprising a graph of the entities based on one or more statuses provided by the user, wherein each status represents a progress of the user with respect to a corresponding entity;
    presenting at least one attribute graph based on one of the attributes and the statuses provided by the user; and
    tracking a status of the user with respect to one or more of the entities, comprising:
        receiving the user status for the one or more entities from the user; and
        applying the user status to the status representation and the attribute graph.

12. The computer-implemented method according to claim 11, further comprising:
    filtering the entities in the list based on one or more of the attributes; and
    updating the list to include only those entities that satisfy the one or more attributes.

13. The computer-implemented method according to claim 12, further comprising:
    updating the attribute graph to include only those entities that satisfy the one or more attributes.

14. The computer-implemented method according to claim 11, further comprising:
    clustering the entities based on at least one of the attributes; and
    displaying the clustered entities.

15. The computer-implemented method according to claim 11, further comprising:
    applying the user status to the attribute graph, comprising:
        assigning a color to each user status;
        determining a number of the entities that satisfy each user status for each variable of the attribute represented by the graph; and
        applying the assigned color to the graph for each variable based on the number of entities associated with that status.

16. The computer-implemented method according to claim 11, wherein the attribute graphs each comprise one of a histogram, pie chart, cloud, and line graph.

17. The computer-implemented method according to claim 11, further comprising:
   modifying the attribute graph, comprising:
      displaying greater resolution of at least a portion of the attribute graph upon placement of a pointer device over the attribute graph by the user; and
      zooming in or out of the attribute graph.

18. The computer-implemented method according to claim 11, further comprising:
   generating at least one of a date histogram, source histogram, and status histogram as the attribute graphs.

19. The computer-implemented method according to claim 11, further comprising:
   receiving from a user, a selection at least a portion of one of the attribute graphs; and
   updating the list of entities to include only those entities that correspond with the selected portion of the attribute graph.

20. The computer-implemented method according to claim 11, further comprising:
   receiving a selection of one of the entities in the list; and
   displaying at least a portion of the selected entity.

\* \* \* \* \*